United States Patent
Lacey et al.

(10) Patent No.: US 10,298,744 B2
(45) Date of Patent: May 21, 2019

(54) METHOD AND ARRANGEMENT FOR POLICY REGULATION OF ELECTRONIC COMMUNICATION DEVICES

(71) Applicant: Comptel Oy, Helsinki (FI)

(72) Inventors: Stephen Lacey, Nummela (FI); Jyrki Berg, Lohja (FI)

(73) Assignee: Comptel Oyj, Helsinki (FI)

( * ) Notice: Subject to any disclaimer, the term of this patent is extended or adjusted under 35 U.S.C. 154(b) by 0 days.

(21) Appl. No.: 15/791,732

(22) Filed: Oct. 24, 2017

(65) Prior Publication Data

US 2019/0124198 A1     Apr. 25, 2019

(51) Int. Cl.
| | |
|---|---|
| *H04M 1/725* | (2006.01) |
| *H04M 15/00* | (2006.01) |
| *H04W 4/80* | (2018.01) |
| *H04W 84/20* | (2009.01) |

(52) U.S. Cl.
CPC ....... *H04M 1/72577* (2013.01); *H04M 15/66* (2013.01); *H04W 4/80* (2018.02); *H04W 84/20* (2013.01)

(58) Field of Classification Search
CPC ....... H04W 84/20; H04W 4/80; H04M 15/66; H04M 1/72577
USPC ........................................................ 455/418
See application file for complete search history.

(56) References Cited

U.S. PATENT DOCUMENTS

| | | | |
|---|---|---|---|
| 2013/0237186 A1* | 9/2013 | Agrawal | H04W 12/02 455/411 |
| 2014/0113593 A1* | 4/2014 | Zhou | H04L 63/20 455/411 |
| 2014/0308924 A1* | 10/2014 | Prakash | H04L 63/20 455/411 |
| 2015/0007273 A1* | 1/2015 | Lin | H04L 63/08 726/4 |
| 2015/0113155 A1* | 4/2015 | Yan | H04L 67/1076 709/228 |

(Continued)

*Primary Examiner* — Inder P Mehra

(57) ABSTRACT

Electronic arrangement, optionally comprising one or more servers, for a mobile communication network to enable dynamic policy regulation, through a master device, of a slave device, being a user device operable in the mobile communication network, the arrangement comprising at least one communication interface for transferring data, at least one processing unit for processing instructions and other data, and memory for storing the instructions and other data, said at least one processing unit being configured, in accordance with the stored instructions, to cause: receiving and storing an indication, preferably from the master device optionally being other user device operable in the mobile communication network, of the slave device, wherein the indication stipulates master and slave association between the devices in controlling usage of network resources by the slave device, receiving and identifying a request, from the master device, indicative of at least one policy adjustment to be enforced on the slave device regarding the usage of network resources, and communicating the at least one policy adjustment to a policy control entity of the mobile communication network to instruct the policy control entity implement said at least one policy adjustment. Related user device and method are presented.

24 Claims, 4 Drawing Sheets

(56) References Cited

U.S. PATENT DOCUMENTS

2016/0170934 A1* 6/2016 Haejong ............. G06F 13/4291
                                                    710/110
2017/0300282 A1* 10/2017 Cho ..................... G06F 3/14
2017/0374611 A1* 12/2017 Pragada ................ H04W 12/06
2018/0074714 A9* 3/2018 Zohar .................. G06F 11/2058

* cited by examiner

METHOD AND ARRANGEMENT FOR POLICY REGULATION OF ELECTRONIC COMMUNICATION DEVICES

PRIORITY

This application does not claim priority of any other application.

TECHNICAL FIELD OF THE INVENTION

The present invention pertains to mobile communication networks and networks connected therewith, user terminals operable in such networks and related control arrangements and methods. More specifically, however not exclusively, the invention concerns a method and arrangement for determining and executing policy regulations relating to user devices, the policy regulations being externally controllable and adjustable by other user devices.

BACKGROUND OF THE INVENTION

In communication networks such as mobile communication networks, it may in some cases be desirable to somehow limit the use of a communication network for another user. Parties willing to limit the use may include e.g. network operators, various service providers and end-users having the power to manage e.g. the subscription or content use associated with other users.

For instance, a first user such as a parent might want to limit digital content that a second user such as a child may have access to through the communication network via a user device, such as a cellular phone or tablet computer, in the possession of the child.

In addition, companies and a plethora of other pools of users may find such control mechanisms useful to filter out, among other uses, potentially harmful or otherwise inappropriate content from remaining data traffic between a network and user devices.

However, the various parties involved have commonly found the available control technologies insufficient, inflexible, complex, unreliable or otherwise unsuitable for their purposes at least having regard to certain use cases to be briefly reviewed below.

For example, in some OTT (over-the-top) type solutions for content distribution, user-specific content control is to be carried out through determining the necessary content delivery settings for a target user by a main user. The settings may be determined by connecting to a network service operating a content control server using a management account and adjusting the profile of the target user as desired.

Data traffic, such as internet content from various content provision platforms, could be then rerouted to a user device of the target user through the content control server or related gateway so that the concerned intermediate entity may inspect and filter the traffic according to the settings and allow only allowable content to ever reach the user device.

The above method of setting traffic limitations basically involves construction of an additional loop in the traffic architecture of the communication network. This may create problems arising, among other sources, from a bottleneck effect that is established in the network due to massive amounts of potentially high bandwidth data to be conveyed therethrough, which may cause undesired latency, reduced data rate and even data loss from the standpoint of a single user. Additionally, even more considerable performance issues such as total downtime of data services may materialize if the aforementioned server that is intended for traffic filtering is malfunctioning or unavailable due to e.g. connectivity issues.

Yet, mere content filtering does not still actually suffice for fulfilling quite a large portion of user and user (terminal) device related control needs arising in the context of mobile networks and communication networks in general.

Namely, instead of or in addition to content filtering, policy control regarding e.g. various QoS related factors such as data transmission rate, connectivity to different networks and services, are at least equally if not more important in a multitude of scenarios wherein limited resources are to be allocated for use by a plurality of users.

The resources may be highly technical with reference to the overall capabilities of the available network infrastructure and related supported technologies. Yet, e.g. service subscriptions of individual users or of a pool of users, with reference to family or corporate type subscriptions, may set additional constraints having regard to the availability of resources to the subscription and assign also a price or cost to the resources based on their mere availability or actual usage.

For example, a monthly data plan may assign a certain price for a certain amount of data transferred during the month as well as define a number of technical characteristics such as maximum or average transmission rate available for the data transfer.

Policy control and related activities are typically autonomously executed by the network based on predefined logic and subscription data in a production environment. The existing solutions for user-initiated management of user subscription or user device related policy control are rare and suffer from awkward limitations what comes to establishing a functional control connection between multiple users and/or user devices.

SUMMARY OF THE INVENTION

In the light of foregoing, one objective of the present invention is to alleviate at least some of the above problems and challenges in the external management, including dynamic control, over the usage of different network resources by a first user terminal, or related subscription, of a first user especially, but not exclusively, when executed by a second user via a second user terminal. By various embodiments of the present invention multiple devices may be linked together via master-slave type relationship, whereupon desired policy restrictions or generally policy adjustments may be flexibly and dynamically introduced without, on the other hand, sacrificing e.g. security in favor of easy re-configurability of the policy settings.

In accordance with one aspect of the present invention an electronic arrangement is provided, optionally comprising one or more servers, for a mobile communication network to enable dynamic policy regulation, through a master device, of a slave device, being a user device operable in the mobile communication network, the arrangement comprising at least one communication interface for transferring data, at least one processing unit for processing instructions and other data, and memory for storing the instructions and other data, said at least one processing unit being configured, in accordance with the stored instructions, to cause:

receiving and storing an indication, preferably from the master device optionally being other user device operable in the mobile communication network, of the slave device, wherein the indication stipulates master and slave association between the devices in controlling usage of network resources, such as data transfer capacity and/or services, by the slave device, receiving and identifying a request, from the master device, indicative of at least one policy adjustment to be enforced on the slave device regarding the usage of network resources, and communicating the at least one policy adjustment to a policy control entity of the mobile communication network to instruct the policy control entity implement said at least one policy adjustment.

According to one other aspect, a user device, optionally a smartphone, tablet or other portable personal communications device, operable in a mobile communication network, comprises at least one communication interface for transferring data relative to the network, at least one processing unit for processing instructions and other data, and memory for storing the instructions and other data, said at least one processing unit being configured, in accordance with the stored instructions, to cause:

communicating an indication of master—slave relationship of the user device and other user device, respectively, to a remote policy adjustment arrangement accessible via the network, receiving control input, optionally via a UI offered via the user device, defining at least one policy adjustment to be taken into use relative to and enforced on the other user device regarding the usage of network resources by the other user device, and communicating a request indicating said at least one policy adjustment to said remote policy adjustment arrangement accessible via the network for execution.

In some aspects of the present invention, instead of user device, some other form of control device could be registered as the master, which is discussed in further detail hereinafter.

According to a further aspect, a method for controlling a mobile communication network to enable slave device policy regulation via a master device, comprises:

registering a first remote device, such as a user device, as a master device, registering at least one user device, different from the first remote device, as a slave device to the master device, wherein the master and slave association between the devices indicates master device—originated control over the usage of network resources, such as data transfer capacity and/or services, by the slave device, receiving, preferably from the master device, a request for policy adjustment to be implemented and enforced on the slave device having regard to the use of network resources, such as communication resources, by the slave device, and communicating the policy adjustment to a policy control entity of the mobile communication network to enable implementing and enforcing the service policy adjustment via the policy control entity.

Having regard to the utility of the present invention, the invention indeed has several advantages and benefits in a great number of use contexts, e.g. family and company contexts, depending on each particular embodiment thereof. According to an embodiment, the present invention may provide an arrangement and method for policy regulation where special new rerouting of traffic such as digital content or other payload data in connection with a slave device is unnecessary. This may in turn eliminate or at least reduce the bottleneck-effect that often occurs with prior art solutions.

Also, connectivity and data availability problems resulting from the unavailability of a server through which the rerouting would be carried out, caused by e.g. technical failure, may be avoided. In fact, the existing network infrastructure and one or more integral entities thereof, such as one or more policy control entities with reference to e.g. a PRCF (Policy and Charging Rules Function), may be cleverly utilized in connection with different embodiments of the present invention for implementing the policy control measures signaled by the arrangement and originally at least partially determined by master devices, typically responsive to user (control) input from a person operating the master device.

Policy regulation refers generally herein to the limitation or adjustment of selected restrictions or in broader sense, options, related to usage of network resources by a slave device, such as one or more bandwidth usage restrictions.

A policy adjustment may specifically refer to setting or defining of one or more parameters regarding the traffic between the network and the slave in terms of available communication technologies and related settings, and/or the actual content. Through the invention, it may thus be possible for a selected 'master' user in the possession of a master device to set limitations regarding the traffic that may be sent to and/or from a slave device of a 'slave' user in a communications network such as a mobile communication network.

For instance, policy regulation may involve adjusting the QOS (Quality of Service) and/or related factors such as bandwidth available to the slave. Availability of a certain service or network technology, such as LTE, may be restricted, or restrictions may be set for e.g. the allocated maximum transfer rate, the maximum amount of data that can be transferred (without temporal constraints or e.g. per certain/selected time period or duration), and/or different bandwidth influence parameters in general.

Parameters related to charging may further be considered and maximum usage limit of originally financial type be therefore set for instance regarding a certain service provider or application. In some embodiments, the solution could be utilized in controlling the balance of (subscription) account associated with the slave device. In case the account is associated with multiple devices or users, control could be targeted to all of them or specifically a portion concerning the slave device. For instance, the balance could be topped up. These various policy regulation actions could be further associated with purchase activity. For example, the master user could trigger and/or authorize a purchase and e.g. a related payment action to add the account balance or specific bandwidth usage related factors such as amount of data transferable (remaining quota) or available data transfer rate (physical bandwidth).

Accordingly, the present invention may be exploited versatilely in both policy regulation and balance/account management associated with user devices and related subscriptions.

As compared to prior art approaches, the invention may provide a preferred solution in cases where deep packet inspection (DPI) is available in the network. DPI could be utilized to enforce e.g. parental controls but the present invention may also be utilized to control or actually eliminate (the need for) DPI. In some embodiments, avoiding, reducing, stopping or otherwise dynamically controlling the use of DPI or similar functionalities may reduce the functional complexity of the network and latency of data transfer through the network.

The policy regulations may also be related to content that could at least in principle, i.e. from a technical standpoint prior to subjecting the content to policy restrictions, be downloaded by the slave device through the network. Access to selected network-accessible resources such as web sites, services, etc. could be prohibited, restricted, enabled, or otherwise controlled by different embodiments of the present invention. Access to selected resources such as web sites associated with a certain keyword, URL (Uniform Resource Locator) or network address (e.g. IP address) could be correspondingly controlled. Still, access to certain identifiable types of traffic (e.g. video, chat) or particular identifiable content items could be controlled.

In some embodiments, policy regulations may also involve a temporal aspect or scope, and certain settings or adjustments may be set to apply e.g. during certain times of day only.

Based on the above, policy restrictions related to a certain service provider could be applied so that only a predetermined amount of traffic is allowed from the service provider for instance during a certain period, for example.

In various embodiments, the slave device may refer to a mobile terminal such as a cellular terminal, e.g. of 'smartphone' type, a tablet, a phablet, wearable electronics such as a wristop device, a portable computer or a desktop computer among other options. The slave device shall have access to a communication network, preferably comprising mobile communication network, and fall under its policy control measures to be a valid target of policy regulation concerning the usage of related network resources by the device. The master device may generally be a similar device. Alternatively, the master device could refer to a device such as a terminal or e.g. server device running at least partially automated control software entity such as a bot, SDK (software development kit) or e.g. web site, which may be installed or be at least accessible via the network.

Through various embodiments, it may be possible for a single master device to specify policy regulations regarding one or a plurality of different types of restrictions for one or more slave devices. For example, restrictions involving data rates as well as material content may be implemented for one slave device. On the other hand, a single slave device may in some embodiments be associated with several master devices.

In various embodiments, the master and slave devices may be conveniently registered and mated (associated) together from the standpoint of the policy control solution suggested herein so that their master-slave relationship is acknowledged at the arrangement, which is typically one requisite checked by the arrangement upfront for enabling the so-called master device to target policy regulation activities towards the slave. According to one preferred embodiment, the master and slave devices may be provided with software, e.g. client application, for interfacing with the network side backend of the solution, through which the devices may be registered in the service and optionally also mutually verify the master-slave statuses involving e.g. local data transfer between the clients. Yet, the client application may be utilized to input policy adjustment requests relative to a slave. Still, the client application may be configured to provide status information on the policy control related rules and settings regarding the hosting device or e.g. controlled slave and/or controlling master.

The present invention may be validly implemented in a great variety of communication networks. Only one example of such a network may be a mobile communication network such as Long Term Evolution (LTE) and/or 3G compliant network. Further examples of applicable network technologies are provided hereinlater.

The exemplary embodiments presented in this text are not to be interpreted to pose limitations to the applicability of the appended claims. The verb "to comprise" is used in this text as an open limitation that does not exclude the existence of unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, may be best understood from the following description of specific, still merely exemplary, embodiments when read in connection with the accompanying drawings.

Finally, numerous considerations provided herein concerning different embodiments of the arrangement may be flexibly applied to the embodiments of the method or user device mutatis mutandis, and vice versa, as being appreciated by a skilled person.

The expression "a number of" refers herein to any positive integer starting from one (1), e.g. one, two, or three.

BRIEF DESCRIPTION OF THE DRAWINGS

Next the invention will be described in greater detail with reference to exemplary embodiments in accordance with the accompanying drawings, in which.

DETAILED DESCRIPTION

Figure 1:
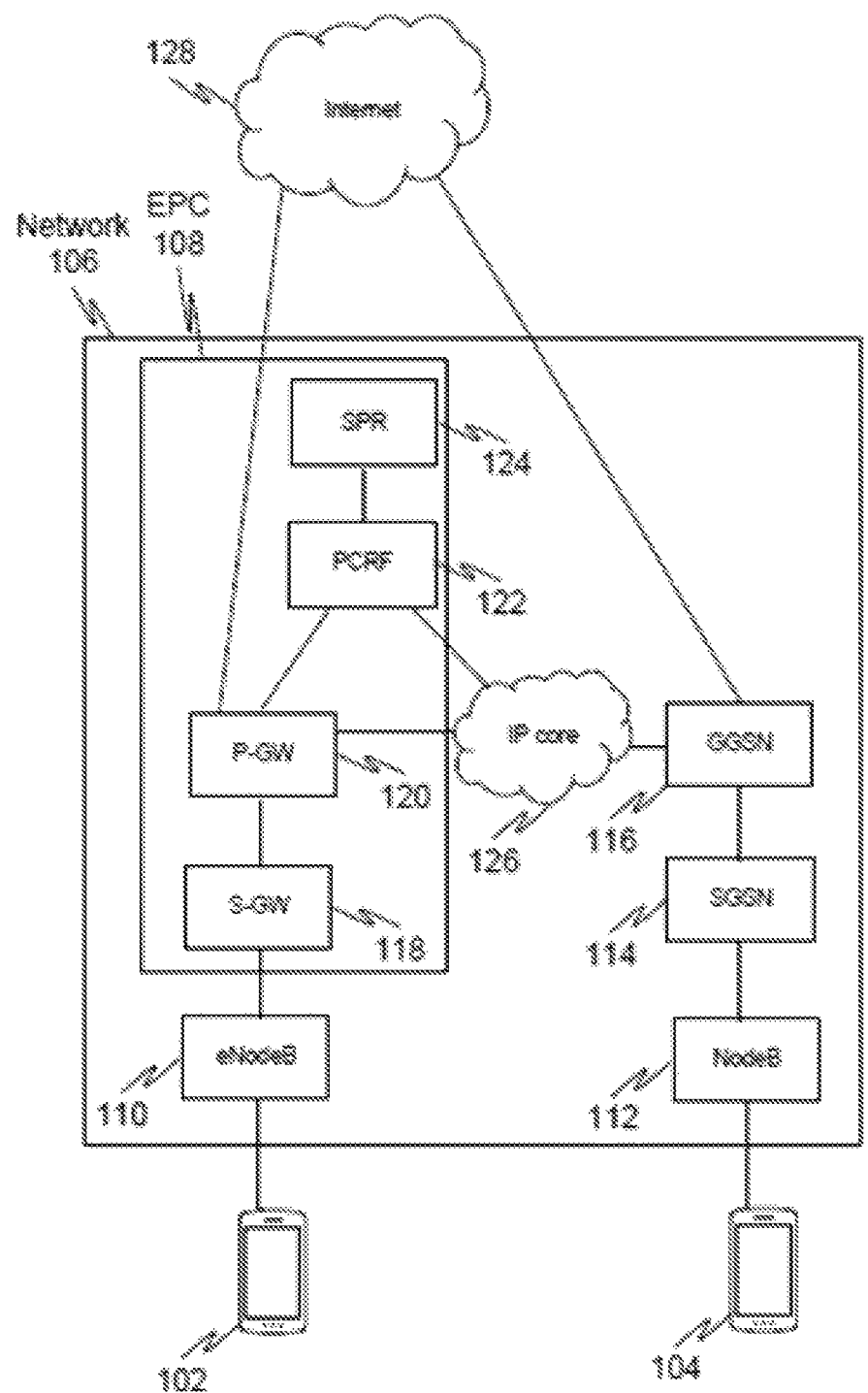
FIG. 1 illustrates one example of network environment wherein various embodiments of the present invention may be implemented.

Different embodiments of the present invention may be utilized in a variety of network architectures and technologies, which include e.g. mobile networks of so-called 3G or 4G type, NFV (network function virtualization) based mobile networks, and/or hybrid networks incorporating features from both traditional (proprietary) mobile networks and NFV architecture.

To provide a more specific example, the suggested solution may be implemented in connection with LTE (Long Term Evolution) network, i.e. a network scheme recommended by the 3rd Generation Partnership Project (3GPP), where the communications are, instead of more traditional circuit-switched connections, carried over an IP channel from user equipment (UE), via OFDM-based (Orthogonal Frequency Division Multiplexing) E-UTRAN (Evolved UMTS Terrestrial Radio Access Network) air interface, to an all-IP core, the Evolved Packet Core (EPC).

The EPC is a multi-access core network that basically enables operators to provide a common packet core network for 3GPP radio access (LTE, 3G, and 2G), non-3GPP radio access (HRPD, WLAN, and WiMAX), as well as fixed access (Ethernet, DSL, cable, and fiber). Different interworking specifications have been issued by the 3GPP for the purpose.

The EPC thus provides gateway access to other networks, operator services, applications, the Internet, etc. while ensuring an acceptable Quality of Experience (QoE) and charging a subscriber for their particular network activity. Even though LTE is in many contexts referenced as 4G technology, the basic LTE does not as such completely fulfill the requirements originally set for 4G wireless service by ITU-R, whereupon it is often considered to fall under the "almost" 4G or "first generation 4G" category, whereas a more recent enhancement thereof named as LTE Advanced meets the requirements more literally.

An embodiment of a policy control entity presented herein may comprise or substantially implement a Policy and Charge Rules Function (PCRF), which may in the case of an LTE network be comprised in the EPC. In terms of physical realization, the policy control entity may be implemented on top of a suitable server computer, or a plurality of those, provided with appropriate software and communication means. The PCRF may have access to or comprise one or more subscriber databases. In particular, the PCRF may comprise or have access to a Subscription Profile Repository (SPR). The PCRF and SPR may be part of a larger Policy and Charging Control (PCC) architecture that may be comprised in the mobile network. Via the PCRF, service providers may e.g. charge subscribers based on their volume usage of high-bandwidth applications or limit application usage.

In connection with 3G/UMTS (Universal Mobile Telecommunications System), PDF (Policy Decision Function) and CRF (Charging Rules Function) could in turn be harnessed into similar use as the PCRF on the LTE/EPC side.

In practice, the PRCF may be configured to determine, decide and manage policies regarding subscriber's session or applications, and accordingly, instruct one or more relevant nodes to enforce them (e.g. PCEF and/or TDF), utilizing a number of PCC rules determined for the purpose. In making policy decisions, the PCRF may connect to SPR and e.g. various provisioning systems. Physically, the PCRF as well as many other network nodes reviewed herein, may be implemented as one or more servers.

PCEF (Policy and Charging Enforcement Function) or similar entity may be provided to perform actual enforcing activities having regard to the set policies. It may be implemented on network nodes such as routers, gateways (e.g. GGSN or P-GW (packet data network) gateway), and/or on a dedicated appliance. The network traffic to be controlled may then flow via the PCEF. In addition, the PCEF entity may further be configured to detect application or data characteristics such as type of traffic carried by traffic (IP) flows such as calls, video, particular applications—relating traffic, etc. Yet, it may serve the PCRF with session information (e.g. subscriber location and/or identifier), which the PCRF may forward to further entities. In practice, PCEF may be configured to utilize a number of PCC rules for evaluating traffic (data packets).

For traffic detection and real-time enforcing of policies and e.g. related QoS activities on the traffic, the network may include e.g. a Traffic Detection Function (TDF), which can detect and identify application traffic (call, video, etc.) in the traffic flows and inform the PRCF about the findings. The TDF may be further configured for policy enforcement, whereupon it reminds of the PCEF. The TDF may be integrated with other entities such as P-GW or implemented as a dedicated one.

Deep packet inspection (DPI) may be provided and included e.g. in the TDF and configured to identify data flows in real-time for policy enforcement.

On-Line Charging System (OCS) may be provided using at least one server functionally connected to e.g. PCEF, TDF and/or PCRF, and configured to manage (limit or end, for example) subscriber's service usage in real-time based on monitoring and charging the account balance. Charging may be dependent on subscription details and e.g. transferred data volumes, connection duration, particular events, etc. The OCS may be thus applied to manage e.g. usage of prepaid type subscriptions.

Off-Line Charging System (OFCS) may be deployed for generating Charging Data Records (CDR) based on service usage regarding e.g. postpaid type subscriptions. It may communicate with the PCEF and/or TDF, for example.

With reference to a scenario of FIG. 1, a merely exemplary network environment is illustrated in connection of which an embodiment of the invention may be implemented.

User devices (UE) 102, 104 such as wired or wireless terminals, e.g. smartphones, tablets, wearable electronics devices, laptops or desktop computers, may be functionally connected to a mobile network 106 by a suitable wireless transceiver.

The mobile network 106 may comprise one or more core networks, such as the EPC 108. The UE 102, 104 may connect to the core network 108 via a radio access network (RAN). FIG. 1 illustrates a network environment involving UE 102 utilizing the E-UTRAN radio access interface of LTE architecture, while UE 104 is utilizing the UTRAN radio access interface of 3G UMTS network. The mobile network 106 may thereby comprise elements from several network technologies such as base stations eNodeB 110 (LTE) or NodeB 112 (3G/UMTS), Serving GPRS Support Node (SGSN) 114, gateway GPRS support node (GGSN) 116, gateways such as serving gateway (S-GW) 118 and/or packet data network gateway (P-GW) 120, policy and charging rules function (PCRF) entity or server 122, and subscriber profile repository (SPR) 124.

IP network or generally PDN 126 (packet data network) may be utilized to connect different parts such as LTE and 3G sub-networks of the overall network architecture considered together.

Through the network environment and associated network elements such as gateways (e.g. P-GW 120), the UE 102, 104 may further have access to other networks such as the internet 128.

In some embodiments, a number of virtualization technologies such as NFV (network function virtualization) and generally cloud architecture may have been applied to virtualize at least some of the functionalities provided by the network 106. Yet, in some embodiments, SDN (software defined network) may have been applied to separate data and control planes thereof.

A plurality of further elements not independently depicted in FIG. 1 may also be comprised in the network, for instance one or more of the afore-reviewed policy control, traffic analysis and/or charging functionalities. The network may in addition to or instead of proprietary equipment comprise various NFV management, orchestration (MANO) and implementation related entities such as servers to host virtualized network functions (NFV) on top of hypervisor-created virtual machines, managed by the MANO architecture.

Figure 2:
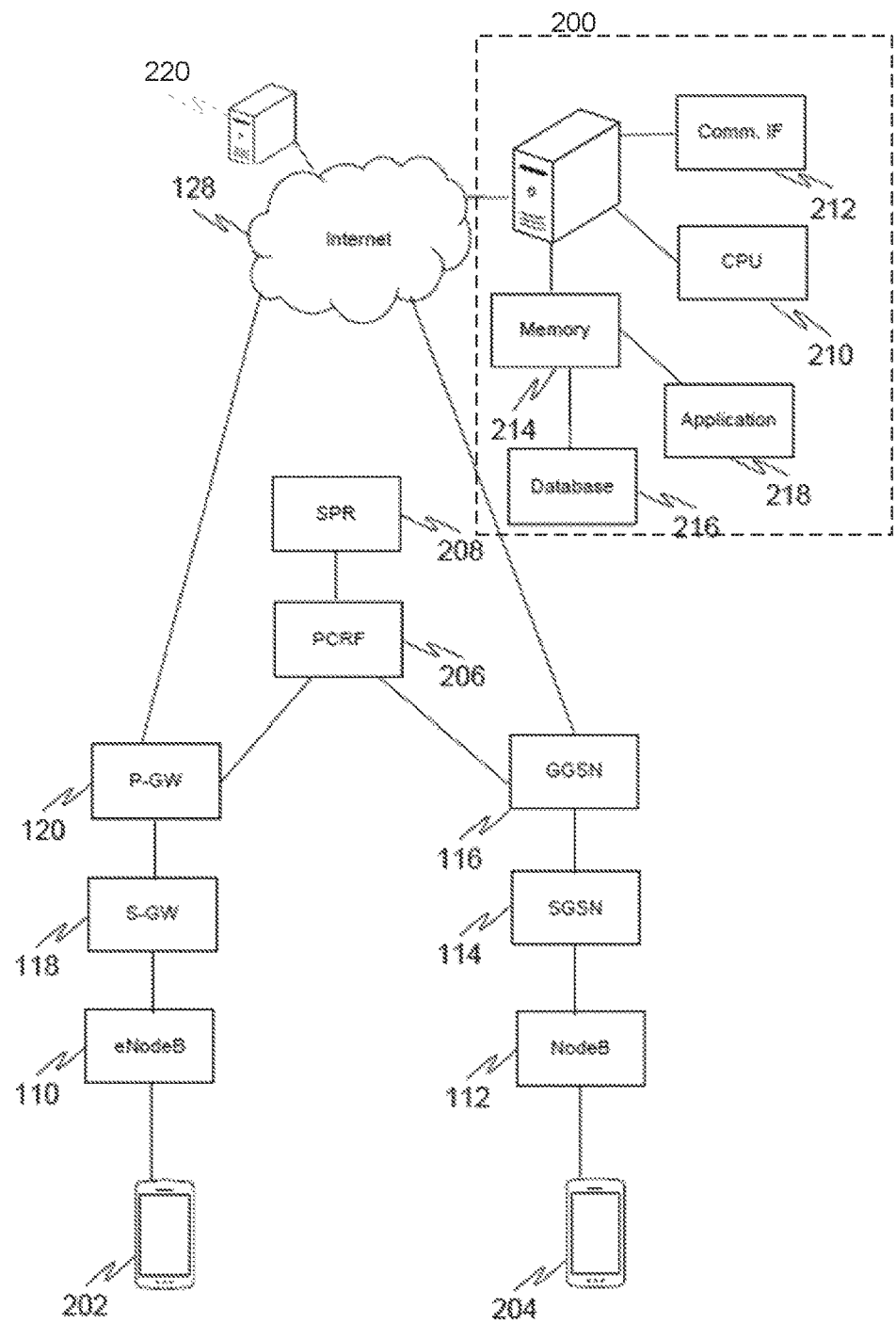
FIG. 2 depicts an arrangement according one embodiment of the present invention and an example of possible related network environment generally in congruence with the environment of FIG. 1.

FIG. 2 shows an arrangement 200 according to an embodiment of the invention in a possible use context thereof including the internet 128 and mobile communication network, which is substantially similar to the network of FIG. 1, whereto a plurality of user (terminal) devices may connect. In some embodiments, also a first device 202 and a second device 204 and/or a number of network elements or entities, e.g. policy control equipment such as the PCRF 206, may further be considered as forming a part of the arrangement 200. Various network elements 110-126 disclosed in FIG. 1 or discussed hereinbefore may be generally utilized also in the scenario of FIG. 2.

The first device 202 is intended to be a master device, wherein master device refers to a control device, such as a user terminal as discussed hereinbefore, through which policy regulations to be enforced on an associated slave device 204 are determined. The second device 204 is thus intended to be a slave device. The slave devices 204 may include mobile terminals, tablets, laptops, wearable electronics, desktop computers, etc. as also contemplated hereinabove.

The arrangement 200 may comprise one or more master devices 202 and one or more slave devices 204. One master device 202 may be associated with one or more slave devices 204. In some embodiments, one slave device 204 may be associated with a plurality of master devices 202. The master and slave devices 202, 204 are generally enabled to communicate with the mobile communication network and networks connected therewith via RANs of the overall network.

In the example of FIG. 2, the master device 202 accesses the internet 128 and arrangement 200 functionally connected thereto via an E-UTRAN type access network, while the slave device 204 is utilizing a UTRAN type access network. Any or all devices 202, 204 may in some other embodiments use a common access network or a common type of access network, or mutually different types of access networks. A single device 202, 204 may be operatively compatible with multiple radio access or generally access technologies. For related communication the devices 202, 204 may contain the necessary communication interfaces, in practice network adapters incorporating e.g. wireless transceivers.

The arrangement 200 as well as most network elements or entities mentioned herein, such as the PCRF 206 or other policy control entity, preferably comprise one or more computing devices such as server devices, or alike, accessible via the mobile communication network and/or the internet 128. Therefore, at least one processing unit such as a microprocessor 210 may be included in the arrangement 200 and configured to obtain, from the master device 202 at least one policy adjustment to be enforced on the at least one slave device 204. To store program instructions of control software (service application) 218 and other data 216, such as policy adjustments, device registration information, master-slave relationship data, etc., the arrangement may include memory 214 with reference to a number of memory chips and/or hard disc(s), for example. The memory 214 may further be at least partially integrated with the processing unit(s) 210.

Similarly, each of the devices 202, 204 may comprise e.g. a processing unit, a memory, and a communication interface (e.g. wireless transceiver) as being appreciated by a person skilled in the art for executing software applications, storing related program instructions and other data, and transferring data such as policy control data with external entities such as the network.

The policy adjustment may be (master) user initiated through a UI offered by the master device 202, exploiting e.g. touchscreen or keypad as applicable input method. Alternatively or additionally, the policy adjustment may be automatically created by executed program logic hosted by the master device 202 (or an entity functionally connected thereto), such as a so-called bot. The logic may be configured to monitor a number of conditions, such as account or subscription related conditions (e.g. balance or remaining quota), fulfillment of which triggers selected policy adjustment measures, for instance. These conditions may relate to the slave and/or master device, or specifically the underlying subscription(s). The originating control data may be conveyed via the mobile communication network and e.g. an external network connected therewith, such as the internet 128, towards the arrangement 200. As understood by a person skilled in the art, a number of further systems and services, e.g. app store or other application or content provision platform, 220 may be further accessible via the network 128.

For communication, the arrangement 200 may support one or more communication interfaces 212, containing the necessary interface adapter(s) such as transceiver(s) operable in a target communication infrastructure, e.g. a wired network. The communication interface 212 may optionally comply with a selected LAN standard, such as Ethernet standard. Via the communication interface 212 the arrangement 200 may be connected to and remain accessible via the internet. Accordingly, the mobile communication network and specifically e.g. one or more policy management elements thereof (e.g. PCRF 206 or other policy control entity) and the arrangement 200 may be connected for the required data transfer.

In some embodiments, the arrangement 200 may at least partially reside in a cloud computing and/or virtualization environment, thereby enabling easy scalability of the associated computing, storage and/or communication resources.

In some embodiments, the mobile communication network may be at least partially implemented by a selected network function virtualization (NFV) technology.

As alluded to hereinbefore, the master device 202 may be configured to offer an UI, or at least front-end thereof, through which a user of the master user device 202 may address the slave device 204 and determine policy regulations to be enforced on the slave device 204. At least one policy adjustment is then received by the arrangement 200, wherein the policy adjustment is related to at least one slave device 204. In some embodiments, it may be possible to define one policy adjustment that is to be enforced on several slave devices 204. A policy adjustment may be or used to establish a PCC rule or other applicable policy control logic.

The slave device 204 may offer a similar or different UI, where policy control options falling under master device's authority are, however, preferably omitted or at least disabled.

The frontend UIs may be provided by native local client applications installed at and running on the devices 202, 204. As with the UI, the overall client software of master 202 and slave 204 devices may be mutually substantially similar or different. Notwithstanding the possible similarity of the software, an instance of the software running on the slave device preferably still has policy adjustment options falling under master device's control disabled or removed, at least from the UI as already mentioned above. The client software applications are configured to communicate with the remote arrangement 200 via the intermediate networks.

Alternatively or additionally, e.g. more generic control applications may be utilized with reference to a browser-accessible (web) UI. The arrangement 200 may itself host a compatible server, such as a web server, communicating with the client software such as browser, or such server function may be implemented by a trusted, functionally connected external entity.

Communication interfaces, or practically interface adapters such as transceivers, of the master, slave and arrangement defining devices provide the desired access to communication medium or media for the communication activities instructed or inspected via the UI.

Policy regulations or adjustments may comprise various restrictions or generally, control rules to be enforced relative to the slave device 204 as discussed hereinearlier. Policy regulations may define e.g. maximum allowed data transfer rate, switch on/off a selected data transfer service or technology, or a mode thereof, and/or affect the remaining balance or quota of subscriber account.

In one exemplary use scenario, the master device 202 may be in the use of a parent and the slave device 204 may be in the use of a child.

In one other scenario, the master device 202 is associated with a managing employee or employer, whereas the slave 204 is associated with non-managing employee in this respect.

In a further scenario, the master device 202 is associated with a company, or company user, offering a product or service to end-users, while the slave 204 is associated with an end-user/client of the company's product or service.

In different scenarios, the utilized hardware and software elements of the network infrastructure, the arrangement 200 and devices 202, 204 may be similar or different, optionally tailored e.g. in terms of available UI features and/or policy control options to each particular use case. Such tailoring may be optionally implemented by software controls turning e.g. certain features on/off, or by other configuration parameters adjustable at the arrangement 200.

Before communication of policy adjustments, the master device 202 and slave device 204 are preferably registered before the arrangement 200, which may refer to general registration, or a registration indicative of a master or slave role of the devices 202, 204, respectively. Device data such as device identification data, user data, subscription data and/or role data (master/slave, having regard to which device) may be stored in the database 216 of the arrangement 200.

The devices 202, 204 may be configured to send a registration or similar message to the arrangement 200 via the mobile communication network. The message may be triggered by a user of the device 202, 204 via the UI offered by the device 202, 204. The UI may be provided by device-run native or generic (e.g. browser) software operatively coupled to the remote arrangement 200 via the communication network as discussed above.

Alternatively, the registration of any of devices 202, 204 and/or their mutual relationships/roles may be executed via other devices, systems, and associated routes, not necessarily including the devices 202, 204 themselves.

The master device 202 may also be configured, via common or separate message(s) sent, to register the second device 204 as a slave device, optionally as outcome of a successful pairing, or 'mating', operation between the devices 202, 204 and arrangement-related software thereat.

The registrations of the devices and their mutual master-slave relationship may preferably be implemented through identification or registration of the MSISDN (Mobile Station International Subscriber Directory Number) or international mobile equipment identity (IMEI) of devices 202, 204. Yet, identification data may include any element selected from the group consisting of: MEID (Mobile Equipment Identifier), IMSI (International Mobile Subscriber Identity), user name, identifier permanently or temporarily uniquely identifying the device, identifier permanently or temporarily uniquely identifying a subscriber and/or subscriber token such as SIM (Subscriber Identity Module) smart card provided in the device, and identifier permanently or temporarily uniquely identifying a phone number associated with the device.

The arrangement 200 additionally comprises or is at least operatively connected to at least one policy control entity. The policy control entity may be, comprise or be implemented in connection with a shown PCRF 206 and/or some other entity or element of the mobile communication network, for instance. Generally, the policy control entity may comprise at least one element selected from the group consisting of: a policy and charging rule function (PCRF), subscription profile repository (SPR), policy and charging enforcement function (PCEF), traffic detection function (TDF), policy decision function (PDF), charging rules function (CRF), deep packet inspection (DPI), charging system, offline charging system (OFCS), and online charging system (OCS). The PCRF and/or other element(s) of the policy control entity may in some embodiments be implemented by means of a virtual machine in at least partially virtualized network environment with reference to the aforesaid NFV. Only PCRF 206 and SPR 208 have been explicitly shown in FIG. 2 for clarity reasons.

The arrangement 200 is configured to indicate, through the network by e.g. appropriate signaling understood by the policy control entity 206, the obtained policy adjustment to be implemented.

The policy control entity may comprise or be at least operatively connected to a database 208. The database may be a service profile repository (SPR) 208, as in the embodiment of FIG. 1. The database such as SPR 208 may be configured to host subscriber-related policies and e.g. related profiles. The hosted, stored data preferably includes policy adjustments received from the arrangement 200.

The at least one policy adjustment may then be enforced by the policy control entity or an entity operatively connected thereto. For example, in the context of e.g. LTE and PCRF 206, the enforcement may be carried out by the aforementioned PCEF entity that may be integrated with a network element that conveys traffic between the network 106 and devices 202, 204, such as the P-GW. The enforcement may be thus generally carried out via the core network 108 of the concerned (mobile) communication network.

Therefore, communication of a policy adjustment originally defined through a master device 202 may be first directed from the master device 202 to the arrangement 200, and specifically e.g. processing unit 210 therein, and then after possible verification, adaptation and/or further optional phases, forwarded to the policy control entity, through which it is finally implemented and optionally also enforced if enforcing is not trusted to an entity or entities external thereto, which remains a somewhat likely option.

Figure 3:
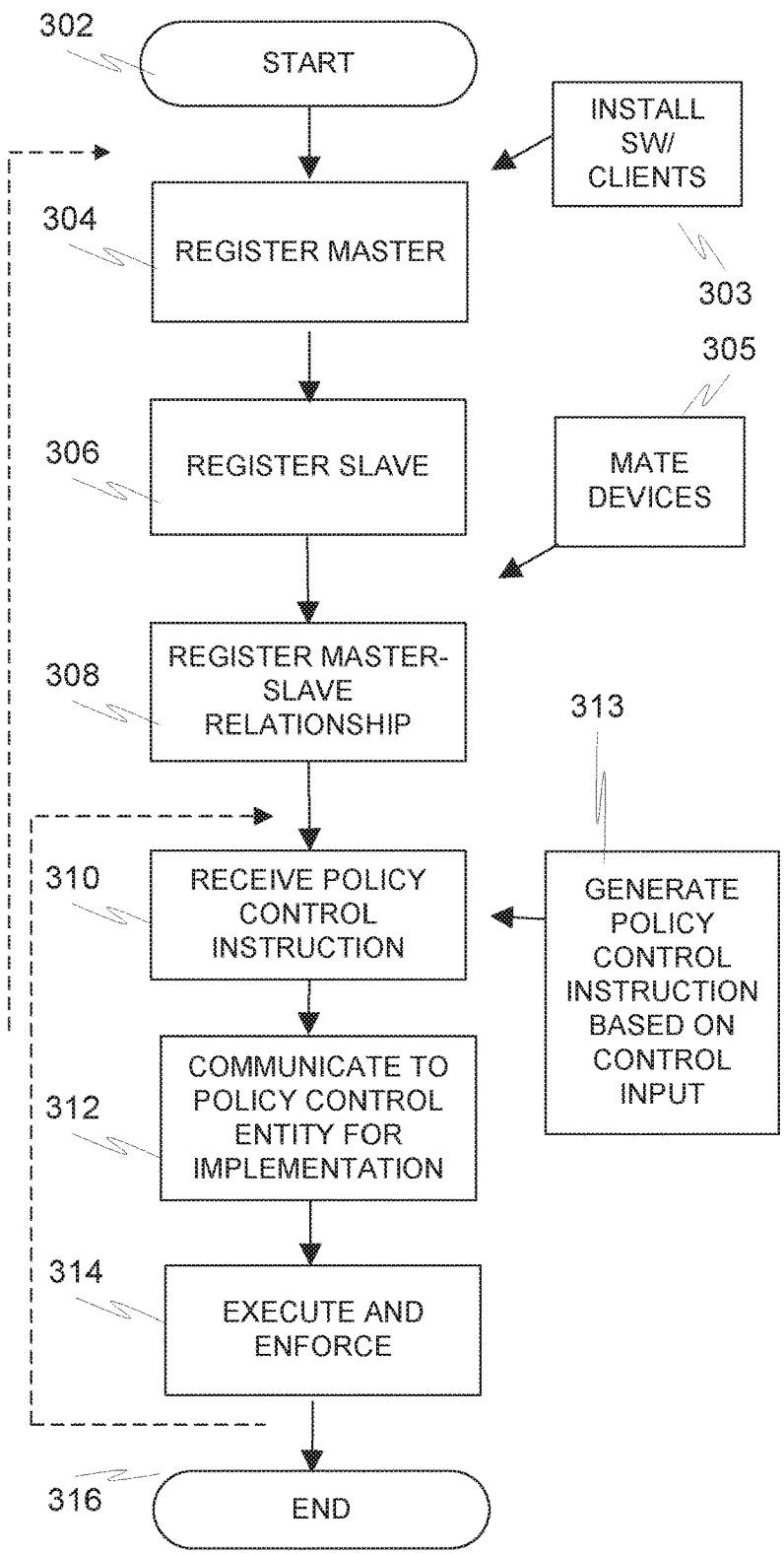
FIG. 3 is a flow diagram concerning an embodiment of a method in accordance with the invention.

FIG. 3 illustrates, at 300, items that may be performed in a method according to an embodiment of the invention. At start-up 302, different initial preparatory tasks may be executed. The arrangement 200 may be configured with the necessary hardware and software (with reference to a number of servers, for example) and connected e.g. via the internet 128 to the target network 106 and optionally validate itself e.g. before a policy control entity thereof.

Item 303 refers to provision of necessary configuration tasks and/or software in the (user) devices 202, 204. For example, software (client) applications may be downloaded or pushed from external sources such as application stores or other repositories being capable of serving the devices 202, 204 with the functionality for duly interfacing with the arrangement 200.

At 304, a first device to subsequently act in master role, typically but not necessarily thus being of a user (terminal) device type, is registered in the arrangement 202 while at 306, at least one other user device to subsequently act in slave role is registered in the arrangement 200.

At 308, master-slave relationship between the devices 202, 204 is registered in the arrangement 200.

How the registrations 304-308 may be in practice implemented has been contemplated hereinabove, and is thus not repeated here. Nevertheless, it shall be worth mentioning that the items 304, 306, 308 may be in some embodiments selectively combined as being clear to a person skilled in the art based on the foregoing.

For example, both devices 202, 204 and their mutual master-slave relationship may be registered substantially at one go, using even a single message, based on pairing (mating) procedure 305 taking place between the devices 202, 204 optionally directly, i.e. without a network infrastructure acting in between, utilizing applicable wireless data transfer technologies available in both devices 202, 204, such as Bluetooth™, infrared, WLAN, RFID (radio frequency ID), ultrasound, inductive or resonant inductive coupling, or NFC (Near-field Communication).

At least one policy adjustment is received at 310 in the arrangement 200 via the master device 202, where the policy adjustment is intended to be enforced on the slave device 204. Item 313 refers to user input, e.g. a menu item selected via the UI, via the master device 202, determining the policy adjustment to be adopted having regard to the slave 204.

The received policy adjustment is communicated at 312 to the policy control entity of the mobile communication network. Finally, at 314, the at least one policy adjustment is implemented including enforcing and potential further tasks such as management, control, monitoring, and reporting e.g. back to the arrangement 200.

The method execution is ended at 316.

The dotted loopback arrows depict the potentially repetitive nature of the execution of various method items. Indeed, new devices may be registered, novel master-slave relationships created, existing ones terminated (e.g. the UI offered by the master device 202 may include a user-selectable option for terminating or at least temporarily disabling the master-slave relationship), and/or new policy adjustments implemented.

Figure 4:
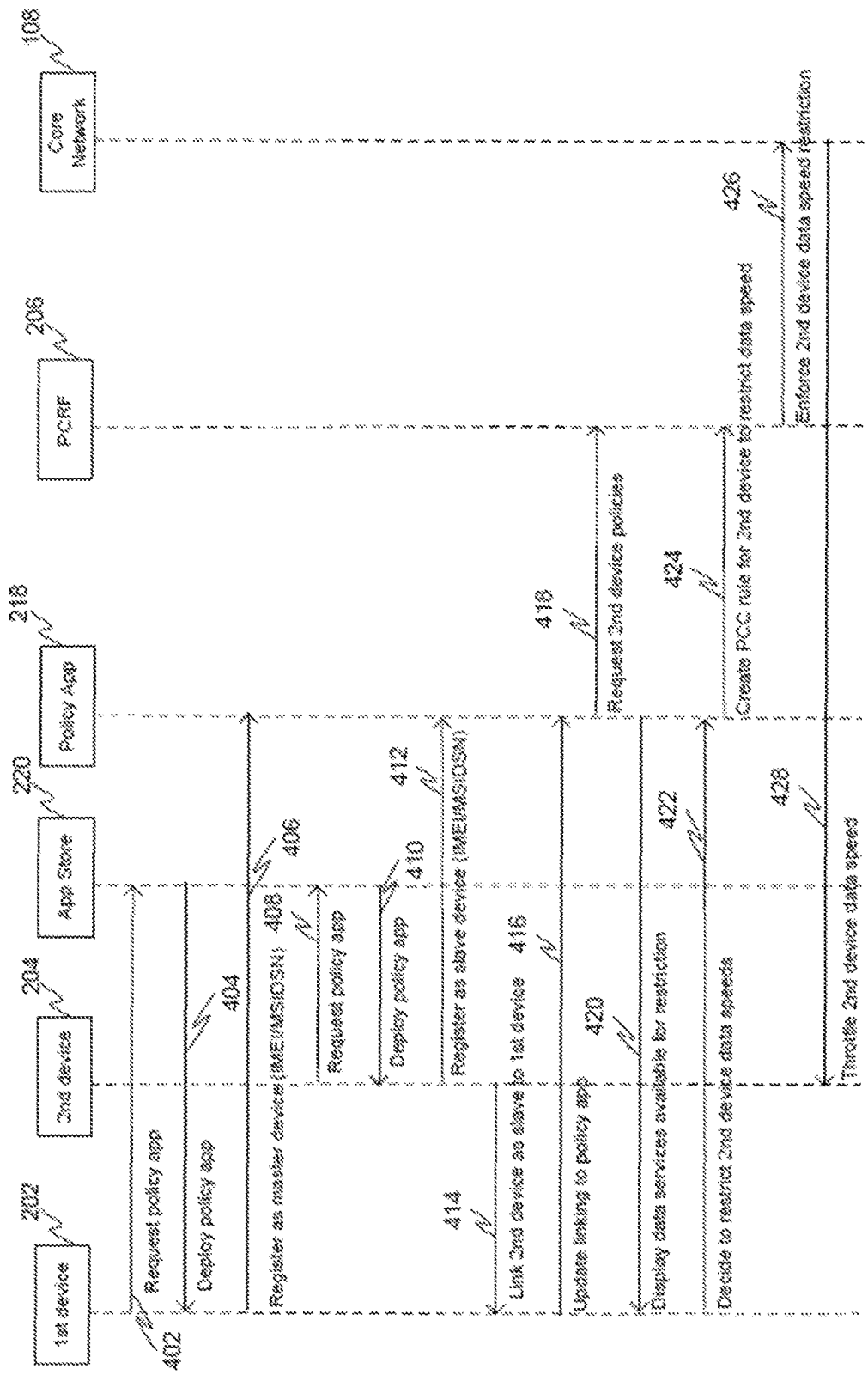
FIG. 4 shows a signalling chart according to an embodiment of the method generally falling under the method of FIG. 3.

FIG. 4 shows a bit more detailed flow, or in this case dominantly a signalling, diagram according to a method and related use scenario that may be covered through one or more embodiments of the invention. The solution of FIG. 4 may be considered as one possible, and perhaps, more concrete implementation option of a more generic process of FIG. 3, whereupon these two representations may be flexibly combined to come up with further embodiments as being appreciated by a person skilled in the art.

At 402, a first device 202 may request from external source, e.g. through an application store ('app' store) 220, the arrangement 200 itself, or other type of digital distribution platform for computer software, to download and/or install or otherwise gain access to on-device client application, which acts as a frontend for policy regulation to be conducted through the operatively connected backend policy control application or service 218 running in the arrangement 200.

At step 404, the on-device policy application is deployed to the first user device 202. The deployment may take place e.g. through data transfer via a number of communication networks such as the internet 128 and mobile network 106. Alternatively, the application could be delivered using some other route, e.g. on a physical, non-transitory carrier such as a memory card.

At 406, the first user device 202 is registered in the policy control mechanism suggested herein, which may refer to registering the device 202 in the backend application 218 via the on-device client. It 202 may be first registered generally without particular role definition(s), or it may be directly registered as a master device with or without indication of related specific slave(s) as considered hereinearlier. The registration may be done based on IMEI and/or MSIDSN of the master device 202 and/or through some other type of registration procedure and identification credentials, such as providing a username and e.g. related password.

At 408, a second device 204 may also request to have access to or obtain the policy application client e.g. through the application store 220, while the client is deployed to the second user device 204, which may be carried out in a similar manner as for the first user device 202.

At 412, the second user device 204 is registered. It may also be registered as a general device, as a generic slave or directly as a slave having regard to particular master(s), the registration process being similar to the registration process of the master device 202.

Registration of master-slave relationship before the arrangement 200 may additionally or alternatively utilize a pairing or mating procedure 414 as discussed hereinbefore, taking place between the concerned devices 202, 204. During pairing, the slave device 204 may, for example, communicate ID information and/or some other characteristic data optionally at least partially in encrypted form to the master 202, which may optionally process the data and forward it to the backend 200 for verification and registration of the relationship. This may add to the perceived and actual security of the process, as local pairing requiring physical proximity of the devices 202, 204 may be deemed an indication of elevated trust between the concerned devices/device users especially when involving mutual, preferably user-triggered and/or accepted, information transfer between the devices 202, 204. In preferred embodiments, proof of successful pairing may indeed be established for role verification, registration and/or policy (adjustment) rights elevation purposes with reference to e.g. a potentially encrypted code or message indicative of the acceptance of the slave role obtained from device 204.

In the light of the foregoing, item 414 essentially links the second device 204 as a slave specifically to the first device 202, i.e. mates them together or designates them as being associated with each other with the slave device 204 being subject to the master device 202. The link may be established via the client apps by activating e.g. related pairing or generally communication feature therein, which may rely upon available data transfer feature such as suitable short-range wireless technology to complete the linkage. The UIs of the devices 202, 204 may provide the user with graphical, textual, tactile and/or auditory instructions for the purpose (For example, "please put your master/slave device adjacent to the target slave/master device to enable pairing" and/or "Confirm your role as master/slave to a connected device by activating control X").

The outcome of pairing may be communicated, utilizing e.g. a related signalling message, to the backend policy application at 416, potentially including the aforesaid proof.

The policy (service) application 218 of the arrangement 200 may then communicate with the PCRF 206 and request policies that are associated with the slave device 204 in item 418. The policy application 218 may trigger indicating, rather typically displaying, at 420, e.g. via the UI of the master device 202, available options for policy adjustment concerning e.g. data services of the slave device 204.

In step 422, it may be communicated by a user, via the UI through the master device 202 that it has been decided to execute one or more policy control activities on the slave 204; for example, allowed data transfer technology (e.g. 3G vs 4G/LTE, or 4G vs 5G) transfer rate of traffic, or quota or balance related to the slave device 204 may restricted. Yet, a new maximum allowable data transfer rate may be set. This is to be understood as a policy adjustment.

A PCC rule may be created at 424 for the slave device 204, the PCC rule corresponding to the received policy adjustment.

At 424, the created PCC rule is communicated from the arrangement 200 to the PCRF 206 and/or other policy control entity using signalling compatible therewith.

The PCRF/policy control entity then at 426 triggers enforcing, typically by instructing PCEF and/or TDF, of the policy adjustment, such as data speed restriction related to the slave device 204 via the core network 108.

In item 428 of FIG. 4, the core network may execute necessary enforcing activities and among other options, throttle the data speed of the slave device 204, i.e. the data speed will be suppressed to the maximum limit that has been previously set by the master device 202.

The present invention has been explained above with reference to a number of embodiments, and several advantages of the invention have been demonstrated. It is clear that the invention is not only restricted to these embodiments, however, but comprises further embodiments within the spirit and scope of inventive thought and especially the following patent claims.

The features recited in dependent claims are mutually freely combinable unless otherwise explicitly stated or being clear to a person skilled in the art due to inherent incompatibility.

The invention claimed is:

1. An electronic device, comprising one or more servers, for a mobile communication network to enable dynamic policy regulation, through a master device, of a slave device, being a user device operable in the mobile communication network, the arrangement comprising at least one communication interface for transferring data, at least one processing unit for processing instructions and other data, and memory for storing the instructions and other data, said at least one processing unit being configured, in accordance with the stored instructions, to cause:

receiving and storing an indication, preferably from the master device being other user device operable in the mobile communication network, of the slave device, wherein the indication stipulates master and slave association between the devices in controlling usage of network resources, receiving and identifying a request, from the master device, indicative of at least one policy adjustment to be enforced on the slave device regarding the usage of network resources, and communicating the at least one policy adjustment to a policy control entity of the mobile communication network to instruct the policy control entity implement said at least one policy adjustment, wherein the policy adjustment alters the settings of at least one element having regard to the slave device selected from the group consisting of: data service settings, data transfer rate, service availability, 5G, 4G or 3.5G service availability, throttling, deep packet inspection, access to a website or URL (Uniform Resource Locator), access to a website or service containing or associated with a selected keyword, access to a selected type of data traffic or content, available account balance, remaining data quota, access to one or more services by a selected service provider, and maximum limit for data transfer per time unit, wherein the settings include a policy rule.

2. The device of claim 1, configured to receive a registration message for policy regulation operations from the master device comprising a characterizing device, user and/or subscription identifier acknowledged by the arrangement.

3. The device of claim 1, configured to receive a registration message for policy regulation operations from the slave device comprising a characterizing device, user and/or subscription identifier acknowledged by the arrangement.

4. The device of claim 1, wherein the indication comprises identifiers of the master and slave device in a selected format acknowledged by the arrangement.

5. The device of claim 1, configured to request, from the policy control entity, subscription data regarding the slave device, including policy information associated with the subscription active in the slave device, further configured to determine available control options for policy regulation by the master device based on the received policy information, and configured to communicate at least part of the options to the master device.

6. The device of claim 1, wherein the policy adjustment is temporally limited, to certain time period that occurs only once or repeatedly.

7. The device of claim 1, configured to identify the master and/or slave device based on at least one element selected from the group consisting of: MSISDN (Mobile Station International Subscriber Directory Number), IMEI (International Mobile Equipment Identity), MEID (Mobile Equipment Identifier), IMSI (International Mobile Subscriber Identity), user name, identifier permanently or temporarily uniquely identifying the device, identifier permanently or temporarily uniquely identifying at least a subscriber and subscriber token provided in the device, and identifier permanently or temporarily uniquely identifying a phone number associated with the device.

8. The device of claim 1, configured to receive the indication stipulating the master and slave association between the master and slave devices from a policy regulation enabling client application running in the master device.

9. The device of claim 1, configured to communicate, to the master device, a number of policies applicable for adjustment, optionally comprising a plurality of applicable policy adjustment options, having regard to the slave device.

10. The device of claim 1, comprising the policy control entity configured to receive and implement the policy adjustment.

11. The device of claim 10, wherein the policy control entity comprises at least one element selected from the group consisting of: a policy and charging rule function (PCRF), subscription profile repository (SPR), policy and charging enforcement function (PCEF), traffic detection function (TDF), policy decision function (PDF), charging rules function (CRF), deep packet inspection (DPI), charging system, offline charging system (OFCS), and online charging system (OCS).

12. The device of claim 1, wherein the mobile communication network comprises at least one element selected from the group consisting of: LTE (Long Term Evolution)

network, 3G network, 4G network, UTRAN (UMTS Terrestrial Radio Access Network), E-UTRAN (Evolved UTRAN), 4G access network, 3G access network, 4G core network, EPC (Evolved Packet Core), at least partially virtualized core network, and at least partially virtualized access network.

13. The device of claim 1, configured to determine a number of policies applicable for adjustment, optionally including a number of policy adjustment options, based on policy data associated with the slave device and available at the policy control entity, wherein the policy data includes current policies.

14. The device of claim 1, configured to transmit a policy control application to the master and/or slave devices.

15. A system comprising the device of claim 1, further comprising the master and slave devices, configured to wirelessly communicate to define master and slave relationship therebetween, respectively, whereupon responsive to the communication the master device is configured to send said indication.

16. A user device operable in a mobile communication network, comprising at least one communication interface for transferring data relative to the network, at least one processing unit for processing instructions and other data, and memory for storing the instructions and other data, said at least one processing unit being configured, in accordance with the stored instructions, to cause:
  communicating an indication of master—slave relationship of the user device and other user device, respectively, to a remote policy adjustment arrangement accessible via the network,
  receiving control input defining at least one policy adjustment to be taken into use relative to and enforced on the other user device regarding the usage of network resources by the other user device, and
  communicating a request indicating said at least one policy adjustment to said remote policy adjustment arrangement accessible via the network for execution, wherein the policy adjustment alters the settings of at least one element having regard to the slave device selected from the group consisting of: data service settings, data transfer rate, service availability, 5G, 4G or 3.5G service availability, throttling, deep packet inspection, access to a website or URL (Uniform Resource Locator), access to a website or service containing or associated with a selected keyword, access to a selected type of data traffic or content, available account balance, remaining data quota, access to one or more services by a selected service provider, and maximum limit for data transfer per time unit, wherein the settings include a policy rule.

17. The device of claim 16, comprising a user interface, optionally a touchscreen, for capturing the control input from a user.

18. The device of claim 16, configured to receive an information element from the other user device indicative of the slave role thereof.

19. The device of claim 18, configured to include the information element or data derived therefrom in the indication sent to the remote policy adjustment arrangement.

20. The device of claim 18, wherein the connection applied for information transfer between the user devices comprises at least one wireless connection mechanism selected from the group consisting of: Bluetooth, WLAN (Wireless Local Area Network), RFID (Radio Frequency Identification), NFC (Near-Field Communication), infrared, inductive or resonant inductive coupling, and ultrasound.

21. The device of claim 16, configured to send a registration message for policy regulation operations to the policy adjustment arrangement, comprising a characterizing device, user and/or subscription identifier acknowledged by the arrangement.

22. A method for controlling a mobile communication network to enable slave device policy regulation via a master device, the method comprising:
  registering a first remote device as a master device,
  registering at least one user device, different from the first remote device, as a slave device to the master device, wherein the master and slave association between the devices indicates master device—originated control over the usage of network resources by the slave device,
  receiving, from the master device, a request for policy adjustment to be implemented and enforced on the slave device having regard to the use of network resources, such as communication resources, by the slave device, and
  communicating the policy adjustment to a policy control entity of the mobile communication network to enable implementing and enforcing the service policy adjustment via the policy control entity, wherein the policy adjustment alters the settings of at least one element having regard to the slave device selected from the group consisting of: data service settings, data transfer rate, service availability, 5G, 4G or 3.5G service availability, throttling, deep packet inspection, access to a website or URL (Uniform Resource Locator), access to a website or service containing or associated with a selected keyword, access to a selected type of data traffic or content, available account balance, remaining data quota, access to one or more services by a selected service provider, and maximum limit for data transfer per time unit, wherein the settings include a policy rule.

23. The method of claim 22, wherein the method further comprises executing the policy adjustment.

24. Computer software product, embodied in a non-transitory computer readable carrier medium, comprising instructions causing a computer to execute method items of claim 22.

* * * * *